W. L. DEMING.
AUTOGRAPHIC REGISTER.
APPLICATION FILED MAY 3, 1915.
1,258,752.
Patented Mar. 12, 1918.
2 SHEETS—SHEET 1.
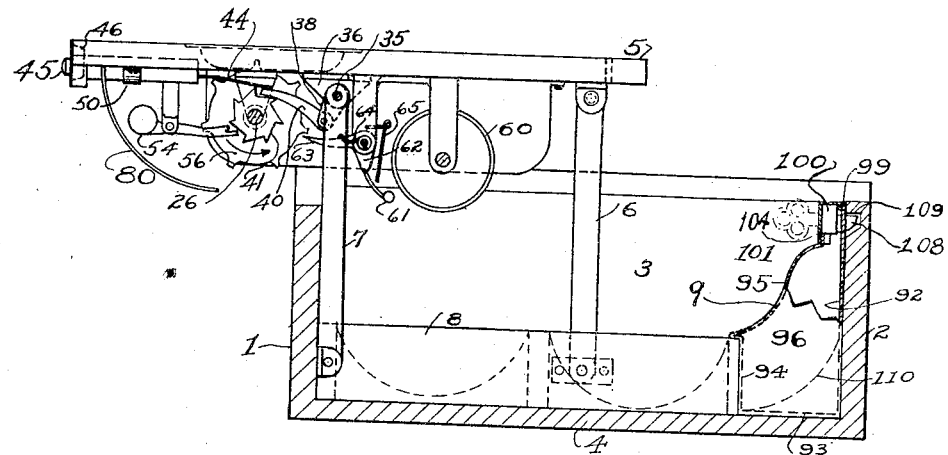
Fig 1
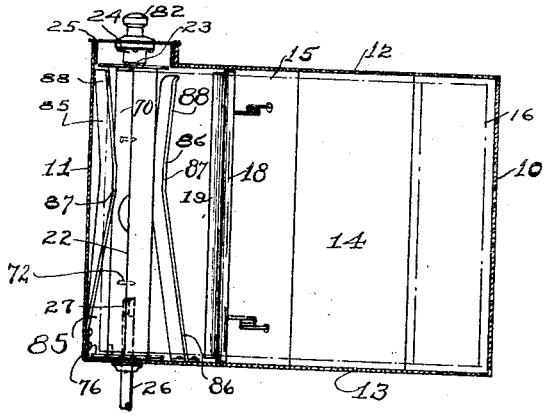
Fig 4
Fig 5
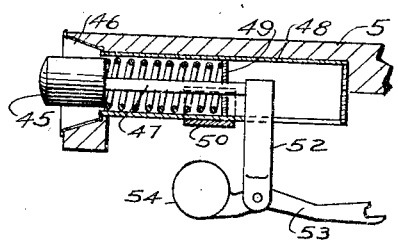
Fig 8
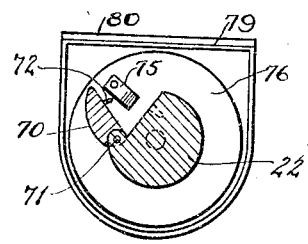
Fig 6
INVENTOR.
William L. Deming,
BY Albert H. Oakes, ATT'Y.

W. L. DEMING.
AUTOGRAPHIC REGISTER.
APPLICATION FILED MAY 3, 1915.

1,258,752.

Patented Mar. 12, 1918.
2 SHEETS—SHEET 2.

INVENTOR
William L. Deming,
BY Albert N. Baker,
ATT'Y

UNITED STATES PATENT OFFICE.

WILLIAM L. DEMING, OF SALEM, OHIO.

AUTOGRAPHIC REGISTER.

1,258,752.

Specification of Letters Patent.   Patented Mar. 12, 1918.

Application filed May 3, 1915.   Serial No. 25,364.

*To all whom it may concern:*

Be it known that I, WILLIAM L. DEMING, a citizen of the United States, residing at Salem, in the county of Columbiana and State of Ohio, have invented a certain new and useful Improvement in Autographic Registers, of which the following is a full, clear, and exact description, reference being had to the accompanying drawings.

This invention relates to devices for recording sales or similar transactions, my register being of that type wherein the transaction is noted in writing on a suitable record strip. In my register, the record strip is preferably inclosed in a casing which may be mounted on the cover of a cash receptacle, with which my device is well adapted for use, and the cover of which may be opened for making change. An object of the invention is to provide an efficient mechanism whereby the operator or clerk may manually advance the record strip after noting the sale, thereby moving the notation into the casing past the writing opening, and mechanism for automatically advancing the record strip when the cover of the cash receptacle is closed, and a feature is the provision of means whereby the customer may, if desired, advance the record strip. Another object of the invention is to cause a bell to be rung, preferably a single tap, each time the record strip is advanced. Another object is to provide an efficient storing means to which the record strip may be readily attached and onto which it may be wound, in connection with means allowing its ready removal from the casing. Another feature of my invention is a special compartment for the cash received in petty sales, which I prefer to arrange so that such cash may be inserted through coin openings in the exterior of the cash receptacle without opening its cover.

Figure 9:
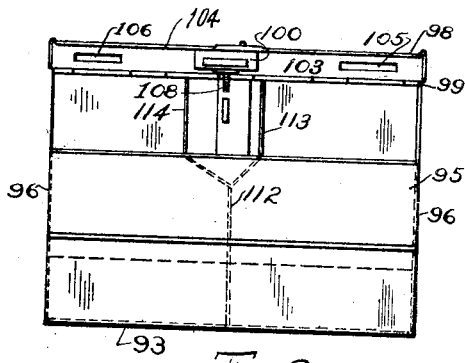
Figure 10:
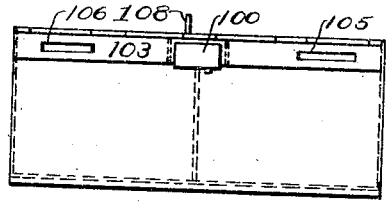
Figure 2:
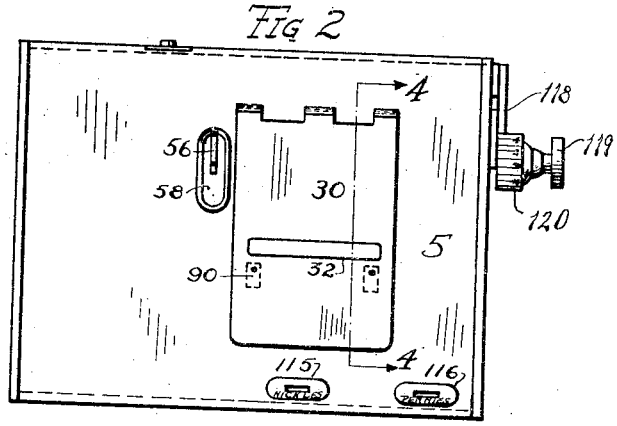
Figure 7:
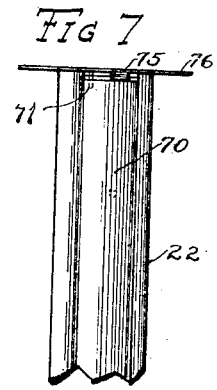
Figure 3:
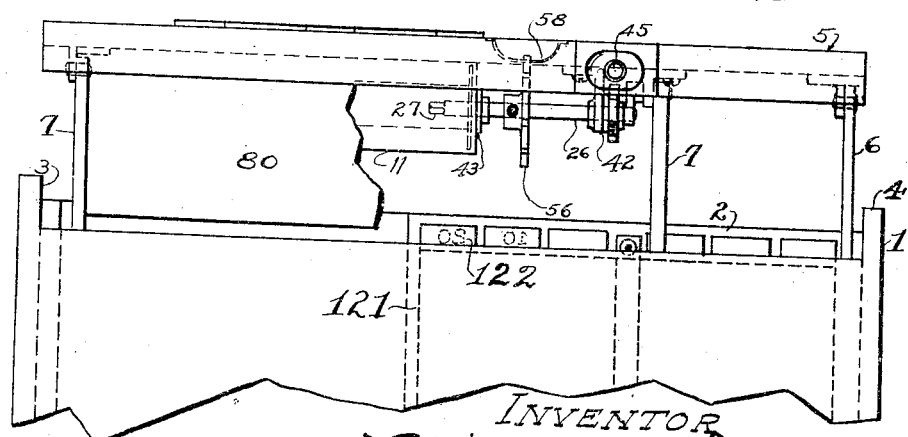

Figure 1 is a transverse section through the cash receptacle, showing the cover in its raised position; Fig. 2 is a plan of the cash receptacle showing the cover closed; Fig. 3 is a rear elevation of a portion of the receptacle with the cover raised and showing the mechanism for advancing the record strip; Fig. 4 is a vertical transverse section through the casing for the record strip, taken substantially on the line 4—4 of Fig. 2; Fig. 5 is a horizontal section through this casing; Fig. 6 is a sectional detail of one end of a roll for the record strip, and Fig. 7 is a detail, being a plan of one end of the same; Fig. 8 is a sectional detail of the plunger mechanism whereby the customer may advance the record strip; Fig. 9 is a front elevation of the compartment for petty sales cash, showing its cover in the raised position; Fig. 10 is a plan of the same with the cover closed.

Referring to the drawings by reference numerals, 1 is the cash receptacle, preferably comprising a rectangular box having a front wall 2, a corresponding rear wall, end walls 3 and bottom 4, leaving an open top adapted to be closed by a horizontal cover 5. The cover is shown as carried on two pairs of parallel arms 6 and 7, pivotally attached at their lower ends to the box and at their upper ends to the cover, as shown. Suitably seating within the box are shown coin trays 8, adjacent the front of which is a compartment 9, preferably metal, forming a container for the coins received on petty sales, and hereinafter more fully described. Such a cash receptacle is the general type shown described and claimed in my prior Patent No. 1,051,200.

Mounted on the under side of the cover 5, is a housing consisting of two trough-shaped portions 10 and 11 having their end portions closed by two plates 12 and 13. Between these two trough portions 10 and 11 is a horizontal bridge member 14 over which a record strip, indicated in broken lines at 15, may be drawn, from a roll 16, shown as resting loosely in the trough 10. The record strip is shown as leading downwardly beneath a roller 18, over a transverse guide 19 pressed toward the roller by springs 20, providing tension on the same and serving as an edge to guide a cutting tool (as a pocket knife for example) by which the used portion of the strip may be severed from the unused portion. From this roll 18 the strip leads to a roller 22, rotatably carried at one end on a trunnion 23 engaging a bearing 24 in a closure 25, for one end of the trough-like portion 11, and the other end of the roller is carried on a rotatable shaft 26, extending into the roller and having a non-circular portion 27 engaging the same for rotating it. This housing beneath the cover 5 is closed by a cover 30, hinged to the cover 5 at 31, and preferably made of thin metal and having a writing opening at 32 over the bridge 14 through which the transaction may be written on the record strip. The cover 30 may be locked by a lock member indicated at 34, shown as having its bolt engaging the cover 5 in Fig. 4.

As the cover is moved downwardly to close the cash receptacle, the arms 6 and 7 swing forwardly about the pivots at their lower ends, thereby swinging rearwardly with relation to the cover. I prefer to use this movement for advancing the record strip each time the cover is closed, in the following manner: one of the arms 7, at the rear of the receptacle, is rigid at its upper end with a stub shaft 35, rotatably carried in a support 36 and having rigidly mounted on its opposite end a rock arm 38, which pivotally carries at its free end a laterally extending pawl 40 adapted to engage a ratchet wheel 41 rigid on the shaft 26, heretofore mentioned. This shaft is shown as carried at one end in a bearing bracket 42, and at the other end in a bearing 43, secured to the side plate 13 of the housing for the record strip. Now as the cover is lowered, it will be seen that the rock arm 38 will be swung upwardly with relation to the cover, moving the pawl 40 rearwardly and advancing the ratchet wheel 41 one tooth, thereby rotating the roller 22 and advancing the record strip. A spring, indicated at 44, secured to the under side of the cover and having its free end bearing against the pawl 40, acts to keep this pawl in engagement with its ratchet wheel and tends to prevent inadvertent rotation.

If the customer sees that the clerk has made a mistake or is in the act of fraudulently altering the notation of the sale, he may, from his position in front of the cash register, advance the record strip by means of a depressible button 45, extending outwardly beneath the forward edge of the cover within a countersunk portion 46 which his finger may enter as the button is pressed inwardly. The button is made rigid on a plunger 47 within a cylindrical casing 48, which guides the button and which is shown as having a guide member 49 receiving the plunger 47. The casing may be secured to the under side of the cover 5 by a strap 50. Depending from the inner end of the plunger is an arm 52, pivotally carrying the pawl 53, having its free end adapted to engage the ratchet wheel 41 and shown as having a weight 54 adapted to hold the pawl in engagement with the ratchet wheel.

When sales to several customers are made in succession, it is not necessary between sales, to close the cover 5. As a convenient means for advancing the record strip without closing the cover I provide a disk-like wheel 56, having a series of projections on its periphery extending through a slot in a depressed finger groove 58 in the top of the cover 5. The strip may be advanced suitable distances by moving the finger longitudinally in this groove, engaging one of the projections on this wheel and rotating the shaft 26 and the roller 22.

A bell 60 may be rung a single tap each time the record strip is advanced, by a clapper 61, carried by a member 62 which is pivotally carried on a member secured to the cover 5. The pivoted member 62 is provided with a laterally extending arm 63 adapted to engage projections on the disk-wheel 56, and as one of the projections on the disk-wheel engages and moves past this projection 63, it swings the clapper rearwardly against the action of a spring 64, until releasing the projection, whereupon the clapper is thrown against the bell. It may be moved away from the bell again by a spring 65 engaging the arm carrying the clapper.

The record strip is preferably secured to the roller 22 by a segment 70, forming part of the roller, hinged thereto at 71 and carrying pins 72 adapted to enter the other portion of the roller when in closed position and pierce the strip which is inserted beneath the hinged segment 70. The strip having been inserted under this segment, the segment is held in position, engaging the strip, by a flat spring 75, shown as mounted on one of the flanges 76 of the roller and engaging the end of the hinged segment while allowing it to be moved past the same by a suitable force.

When it is desired to remove the strip it is severed along the transverse member 19 with any sharp instrument, as described, the roller is turned sufficiently to wind the intervening portion of the strip and is then withdrawn from its casing. A pin 78 carried by the cover 5 and engaging an inwardly turned flange 79 and the closure 25 heretofore mentioned, prevent the removal of the roller when the cover 30 is closed. A suitable knob 82 is provided on this closure and may be grasped to remove the roller when the pin 78 is raised.

To prevent the paper becoming loosened on the roller and catching on the casing as the roller is removed through the opening, which the member 25 closes, I have provided long flat springs 85 and 86; the spring 85 being secured to the side of the housing and extending inwardly and engaging the record strip at 87 and having an outwardly extending end 88. The spring 86 is secured to the side plate 13 and similarly shaped. It is obvious that these springs will prevent the paper unrolling from the roll while it is being withdrawn, and their flared ends engaging the inner flange of the roller will be easily separated, permitting the roller to be again easily inserted. A tension may be provided on the record strip so that it will be taut beneath the writing opening. For example, I have indicated flat springs 90, carried on the under side of the cover 30 and engaging the record strip just before it reaches the opening 32 to provide such tension. Suitable depending aprons or guards, may be provided to conceal the mechanism for rotating the roller at the side edges of the cover and so arranged that they will enter the receptacle 1 as the cover is closed, in addition to an inwardly curved guard at the back, as shown for example, at 80, Figs. 1 and 3.

The receptacle 9 for coins received on petty sales, as stated, is preferably a metal receptacle in front of the coin trays, having a rear wall 92, bottom 93, front wall 94, and a sloping top 95 with two end walls 96. The top extends nearly to the rear wall, leaving a narrow opening which is closed by a cover 98 hinged at 99 to the top of wall 92 and carrying a lock 100, having its bolt 101 adapted to engage the edge of the sloping top. This cover comprises a top portion 103 and a depending side portion 104, extending down over the lock and meeting the top 95. The portion 103 is provided with slots 105 and 106 of different sizes, to receive coins, such as, for example, pennies and nickels. Carried by the cover is a rearward extension 108, shown as mounted on the rear portion of the lock and engaging a notch 109 in the front wall 2 of the cash receptacle. It will be seen that when the cover for the receptacle 9 is locked it is secured in position in the receptacle at the same time, for the projection 108 prevents it being moved upwardly, while the coin trays 8, preferably permanently secured, prevent it swinging rearwardly to remove the projection 108 from its notch.

To insure the coins sliding easily from the receptacle 9, I have provided an upwardly curved bottom 110, and an intermediate partition 112, dividing the receptacle into two or more compartments. The partition itself is divided into two portions substantially forming a Y at 113—114, to surround the lock 110 and at the same time keep the coins from the two compartments separated as they are dropped through openings 115 and 116 in the cover 2, registering with the openings 105 and 106 respectively when the cover is closed. This petty cash receptacle affords considerable convenience in that it saves the opening of the cover in many of the sales, for whenever the amount received on a sale is even change, comprising either one or several coins, they may be dropped through the cover and the sale recorded, the amount of the sale which may be treated in this manner being limited only by the size of the coin or the rule of the proprietor.

Longitudinally alined with the petty cash receptacle 9 and extending between it and the other side of the box 1, is a plurality of leaves 121, forming a file for paper-currency, checks and the like, each of the leaves being provided with a tab 122, having thereon numbers indicating the denomination of currency to be filed in the adjacent space, and these may be secured in position by a transverse rod (not shown) running through eyelets at the bottom. These leaves are arranged one behind the other after the manner of an ordinary card file or letter file, and the checks or bills of paper currency are filed between them according to the denomination indicated on the tabs 122. They stand in substantially upright position in the space provided in the cash receptacle and may be secured after the manner of the leaves of a letter file, by the rod, as described. It will be noted that the arrangement of the cash receptacle 1 is very convenient and that when the cover is raised easy access may be obtained to the coin trays 8 and to the paper currency files, which normally stand against the front wall 2 and do not interfere with reaching the hand in to the coin trays. It will also be noted that the receptacle for petty sales being narrow at the top does not interrupt easy access to the coin trays, while it stands in a position from which it may be easily removed when unlocked, as described.

The cover 5 may be raised and lowered by any suitable means on the outside of the casing; for example, I have shown a crank arm 118, having connection with one of the arms 7 and carrying a handle 119 controlled by a combination lock 120, which allows the arm to be swung, raising the cover as described in my prior patent above referred to.

Having thus described my invention, what I claim is:

1. The combination, with a bodily movable support and mechanism for carrying it, of a casing mounted on the support, a record strip within the casing, a roller on which the record strip may be wound, a shaft engaging the record strip, a wheel on said shaft projecting through the support adapted to be engaged from the other side thereof, a ratchet wheel on the shaft, a pawl engaging the ratchet wheel operated by the support-carrying mechanism, a second pawl engaging said ratchet wheel, a plunger normally free from the ratchet wheel but adapted to be manually moved to rotate said ratchet wheel.

2. In a device of the character described, the combination with a suitable support, of a casing for a record strip having a cavity for the unused portion of the record strip and having a roller on which the used portion may be wound, means for rotating said roller to advance the record strip, a cover closing said casing and having a writing opening, means for applying tension to the record strip before it reaches the writing opening, a guide adjacent the roller over which said record strip is drawn, and springs carrying the guide and pressing it toward the roller to frictionally engage the record strip, said guide providing convenient means for severing the record strip along the same.

3. In a device of the character described, the combination with a suitable support, of a casing for a record strip, a roller on which the record strip may be wound, an opening in the casing adjacent one end of the roller for the record strip, means for closing said opening and having a bearing for one end of the roller, a shaft extending into the roller and engaging the same at the other end for rotating it, means for holding said closing means in position adapted to be removed to remove the roller from the casing longitudinally, and leaf springs carried by the casing and adapted to press against the record strip wound on the roller, said springs being so shaped as to allow ready removal and replacement of the roller while preventing the record strip on the roller unwinding when it is being withdrawn.

4. The combination, with a cash receptacle having an open top, a bodily movable cover adapted to close the same, money compartments within the cash receptacle and a separate compartment closed independently of said cover for receiving coins and having openings in its upper side, and openings in the cover adapted to register with said openings when the cover is closed, whereby coins may be inserted into said compartment without raising the cover.

5. The combination, with a cash receptacle having an open top, a bodily movable cover adapted to close the same, money compartments within the cash receptacle, a compartment for coins seating in the same and having openings in its upper side, openings in the cover adapted to register with said openings when the cover is closed, whereby coins may be inserted into said compartment without raising the cover, said coin compartment being removable and having a cover, means for locking said cover closed, and a lateral projection carried by the cover and adapted to engage the side of the cash receptacle to prevent its removal from the receptacle when it is locked.

6. The combination with a support, of a casing carried by the support adapted to contain a record strip, a roller on which said record strip may be wound, a shaft engaging said roller, a wheel on said shaft, said support having a depressed portion and an opening in the bottom thereof through which said wheel may extend exposing a portion of its periphery adapted to be engaged and operated by the finger to rotate the roller and advance the record strip.

7. The combination, with a movable support, a casing carried by the support and adapted to contain a record strip, a roller on which the record strip may be wound, a shaft for rotating the roller, a wheel on said shaft, said support having an opening therethrough through which said wheel may project exposing a portion of its periphery, said wheel having equally spaced outward projections on its periphery adapted to be engaged by the finger to advance the record strip definite distances, and means for automatically advancing the record strip upon the movement of said support.

In testimony whereof, I hereunto affix my signature in the presence of two witnesses.

WILLIAM L. DEMING.

Witnesses:
 ROBERT H. BATES,
 JUSTIN W. MACKLIN.

Copies of this patent may be obtained for five cents each, by addressing the "Commissioner of Patents, Washington, D. C."